(12) United States Patent
Yamada (10) Patent No.: US 7,103,254 B2
(45) Date of Patent: Sep. 5, 2006

(54) OPTICAL CONNECTOR END FACE GRINDING APPARATUS

(75) Inventor: Kunio Yamada, Matsudo (JP)

(73) Assignee: Seikoh Giken Co., Ltd., (JP)

( * ) Notice: Subject to any disclaimer, the term of this patent is extended or adjusted under 35 U.S.C. 154(b) by 0 days.

(21) Appl. No.: 10/921,828

(22) Filed: Aug. 20, 2004

(65) Prior Publication Data

US 2005/0078928 A1  Apr. 14, 2005

(30) Foreign Application Priority Data

Aug. 25, 2003 (JP) ............ P2003-300466

(51) Int. Cl.
*G02B 6/00* (2006.01)
(52) U.S. Cl. ........................ 385/134; 385/85
(58) Field of Classification Search ............... 385/134, 385/85
See application file for complete search history.

(56) References Cited

U.S. PATENT DOCUMENTS 4,979,334 A * 12/1990 Takahashi .............. 451/271
5,140,777 A * 8/1992 Ushiyama et al. ............. 451/5
5,516,328 A * 5/1996 Kawada ...................... 451/259
6,280,293 B1 * 8/2001 Minami et al. ............... 451/10
2003/0036342 A1 * 2/2003 Yamada et al. ............... 451/66

FOREIGN PATENT DOCUMENTS

JP  2002-18691  1/2002

* cited by examiner

*Primary Examiner*—Ellen E. Kim
(74) *Attorney, Agent, or Firm*—Blank Rome LLP (57) ABSTRACT

An optical connector end face grinding apparatus comprises a grinding apparatus main body, a sliding plate and a grinding bolder. The grinding apparatus main body further comprises an eccentric member driven by a motor and a guide pin. The sliding plate further provides a grinding pad on which is disposed a grinding film and moves in a reciprocal action along a guide pin in synchronism with the circular movement of the rotation of the eccentric member. An optical connector with a ferrule can be attached to and detached from the grinding holder, which positions the end face of the ferrule in a predetermined position relative to the grinding film in the rotational center of the eccentric member.

3 Claims, 8 Drawing Sheets

OPTICAL CONNECTOR END FACE GRINDING APPARATUS

CROSS-REFERENCE TO RELATED APPLICATIONS

This application is based upon and claims the benefit of priority from Japanese Patent Application No. 2003-300466 filed on Aug. 25, 2003, the entire content of which is incorporated by reference herein.

BACKGROUND OF THE INVENTION

1. Field of the Invention

The present invention relates to an optical connector end face grinding apparatus applied for example for re-grinding the end face of a ferrule of an optical connector with attached optical fiber.

2. Description of Related Art

Generally, optical connectors (connectors with optical fibers attached) are used for connections between devices used by subscribers and devices used by a station. This type of optical connector is a device used for connecting or disconnecting a line and is designed with a structure capable of withstanding 1,000 connection/disconnection operations.

Because an optical connector is repeatedly connected and disconnected, dust existing in the atmosphere adheres to the ferrule end face of the optical connector. The optical fiber suffers minute damage because of this dust, which causes increased connection losses. Once damage has been done to an optical fiber, such losses cannot be reduced even by cleaning the ferrule end face using a cleaning tool and the damage must be repaired by re-grinding the end face of the optical fiber with a grinder.

Furthermore, the location at which connection and disconnection of an optical connector is performed is frequently a narrow, cramped space. Because an optical connector must be removed from a device and re-ground in such narrow, cramped spaces, a small simple, handy type grinding apparatus that is able to perform the grinding operation in such spaces must be used.

A conventional grinding machine used for this purpose has been disclosed, for example, in Japanese Unexamined Patent Application Publication No. 2002-18691. This kind of conventional grinding machine, however, requires complex mechanisms for the grinding action as the grinding plate makes a planetary movement while inducing incremental phase lag. Problems thus arise because miniaturization is rendered difficult, additional costs are incurred and maintenance becomes more burdensome.

SUMMARY OF THE INVENTION

In order to solve the above-mentioned problems, it is an object of the present invention to provide an optical connector end face grinding apparatus wherein the mechanisms required for the grinding operations are simple, are capable of miniaturization and are advantageous in terms of cost and maintenance requirements.

In order to achieve the above-mentioned objectives, according to a first aspect of the invention, an optical connector end face grinding apparatus is provided. The optical connector end face grinding apparatus comprises: a grinding apparatus main body including a motor-driven eccentric member; a sliding plate that slides in conjunction with said eccentric member and includes a grinding pad on which is disposed a grinding film; and a grinding holder to which an optical connector can be attached and detached, and which positions the end face of the ferrule of an attached optical connector in the predetermined position on said grinding film in the rotation axis of the eccentric member.

According to another aspect of the invention, an optical connector end face grinding apparatus is provided. The optical connector end face grinding apparatus comprises: a grinding apparatus main body including a motor-driven eccentric member and a guide pin; a sliding plate that slides in a reciprocating motion along the guide pin in conjunction with the circular motion accompanying the rotation of said eccentric member and includes a grinding pad on which is disposed a grinding film; and a grinding holder to which an optical connector can be attached and detached, and which positions the end face of the ferrule of an attached optical connector in the predetermined position on said grinding film in the rotation axis of the eccentric member.

According to yet another aspect of the invention, an optical connector end face grinding apparatus is provided wherein said grinding film has a rectangular shape, and when the eccentric member is rotated, the end face of the ferrule of an optical connector moves relative to the grinding film in a substantially one half region of said grinding film located on one side in a lengthwise direction thereof.

According to still another aspect of the invention, an optical connector end face grinding apparatus is provided. The optical connector end face grinding apparatus comprises: a grinding apparatus main body including a base plate having a sliding surface; an eccentric member supported by the base plate so as to be rotatable about a rotation axis perpendicular to the sliding surface of the base plate, the eccentric member having an eccentric protrusion eccentrically positioned in relation to the rotation axis and extending parallel to the rotation axis; a guide pin fixed to the base plate and extending parallel to the rotation axis; a sliding plate slidably supported by the sliding surface of the base plate, the sliding plate having an insertion hole for receiving said eccentric protrusion and an elongated slot for receiving said guide pin such that said guide pin can slide only in a lengthwise direction of the slot in relation to said sliding plate, the sliding plate further having a grinding pad on which a grinding film is disposed; and a grinding holder for holding an optical connector and positioning the end face of the ferrule of the optical connector such that the end face is in contact with the grinding film in the rotation axis of the eccentric member.

According to another aspect of the invention, an optical connector end face grinding apparatus is provided wherein the diameter of the insertion hole is substantially the same as the diameter of the eccentric protrusion and the width of the elongated slot is substantially the same as the diameter of the guide pin, and the insertion hole is located at a position of the rear face of the sliding plate along the longitudinal axis of the elongated slot.

According to a further aspect of the invention, an optical connector end face grinding apparatus is provided wherein when the eccentric member is rotated by a motor, a portion of the sliding plate near the insertion hole rotates substantially about the rotation axis of the eccentric member, and a portion of the sliding plate near the elongated slot reciprocates substantially along the longitudinal axis of the elongated slot.

BRIEF DESCRIPTION OF THE ACCOMPANYING DRAWINGS

These and other objects, features and advantages of the present invention will become clearer from the following description of an exemplary embodiment of the invention, read in connection with the accompanying drawings in which.

DETAILED DESCRIPTION OF THE INVENTION

An exemplary embodiment of the invention will now be described below with reference to the accompanying drawings. The described exemplary embodiment is intended to assist the understanding of the invention, and is not intended to limit the scope of the invention in any way. In the drawings, like reference numerals identify like elements.

Figure 1:
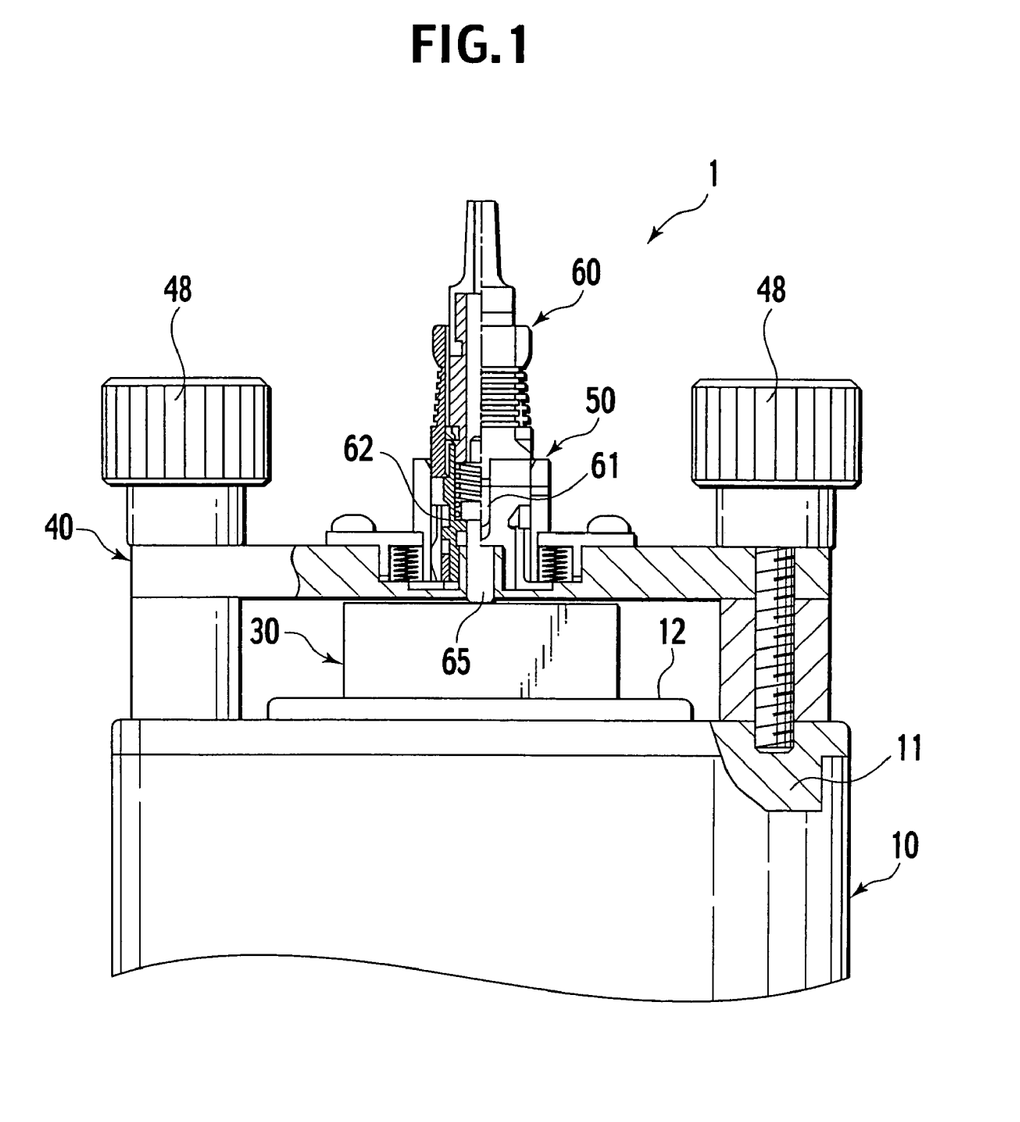
FIG. 1 is a front view, partly sectional, of an optical connector end face grinding apparatus according to the exemplary embodiment of the invention.
Figure 2:
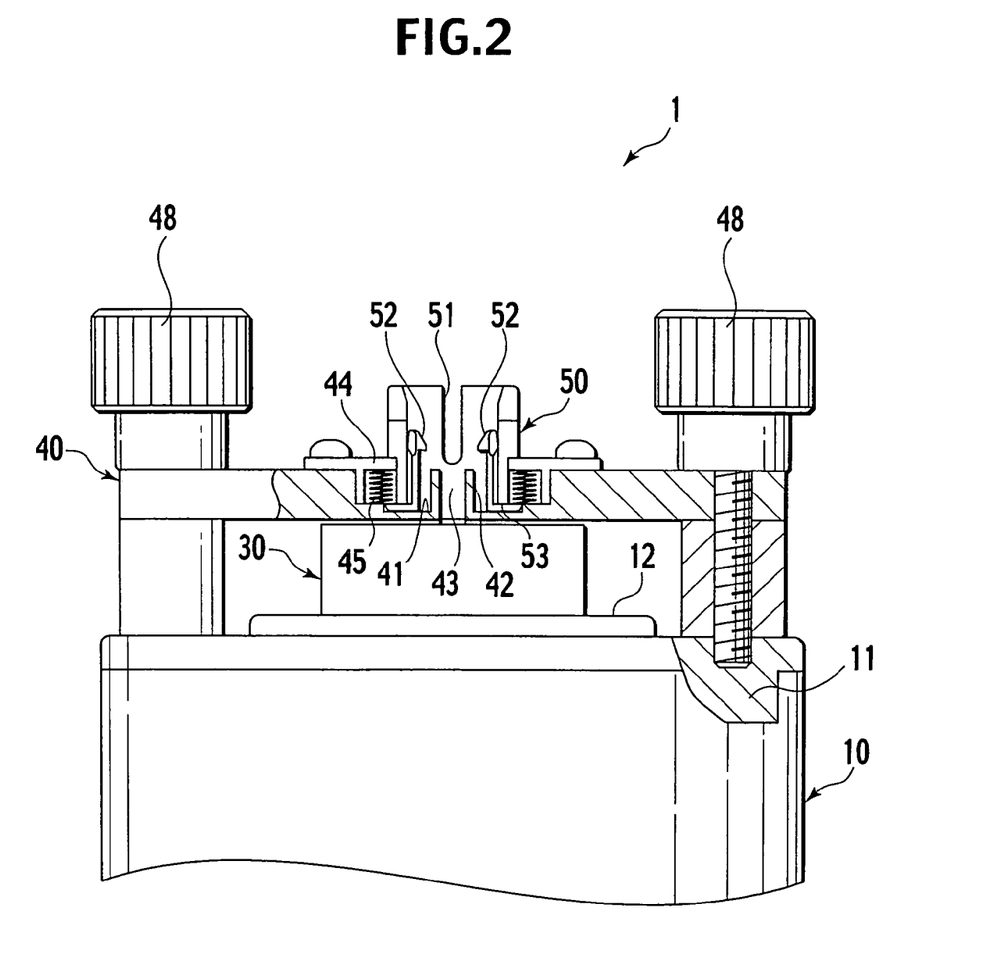
FIG. 2 is a front view, partly sectional, of the optical connector end face grinding apparatus shown in FIG. 1 with the optical connector removed.
Figure 3:
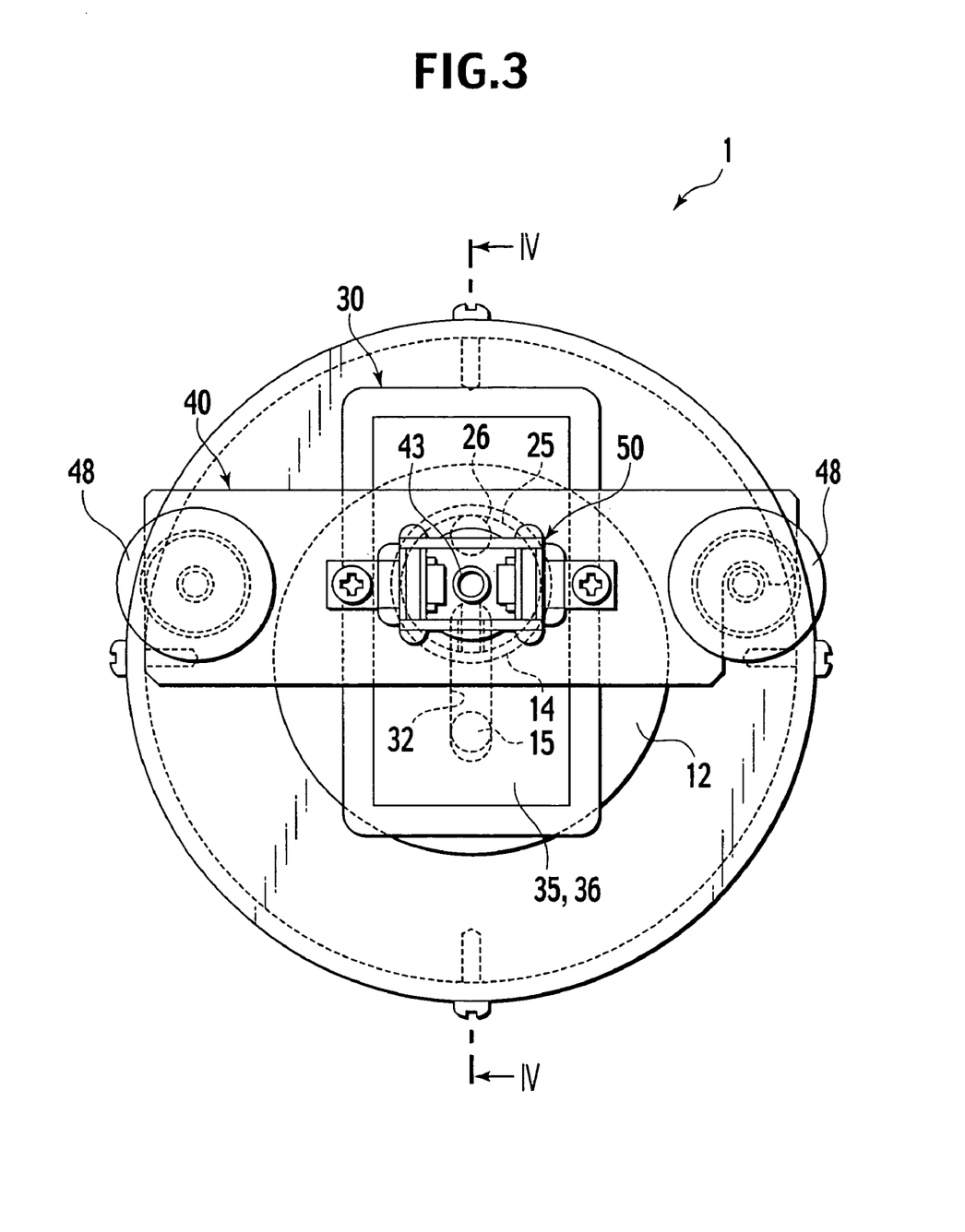
FIG. 3 is a plan view of the optical connector end face grinding apparatus shown in FIG. 2.
Figure 4:
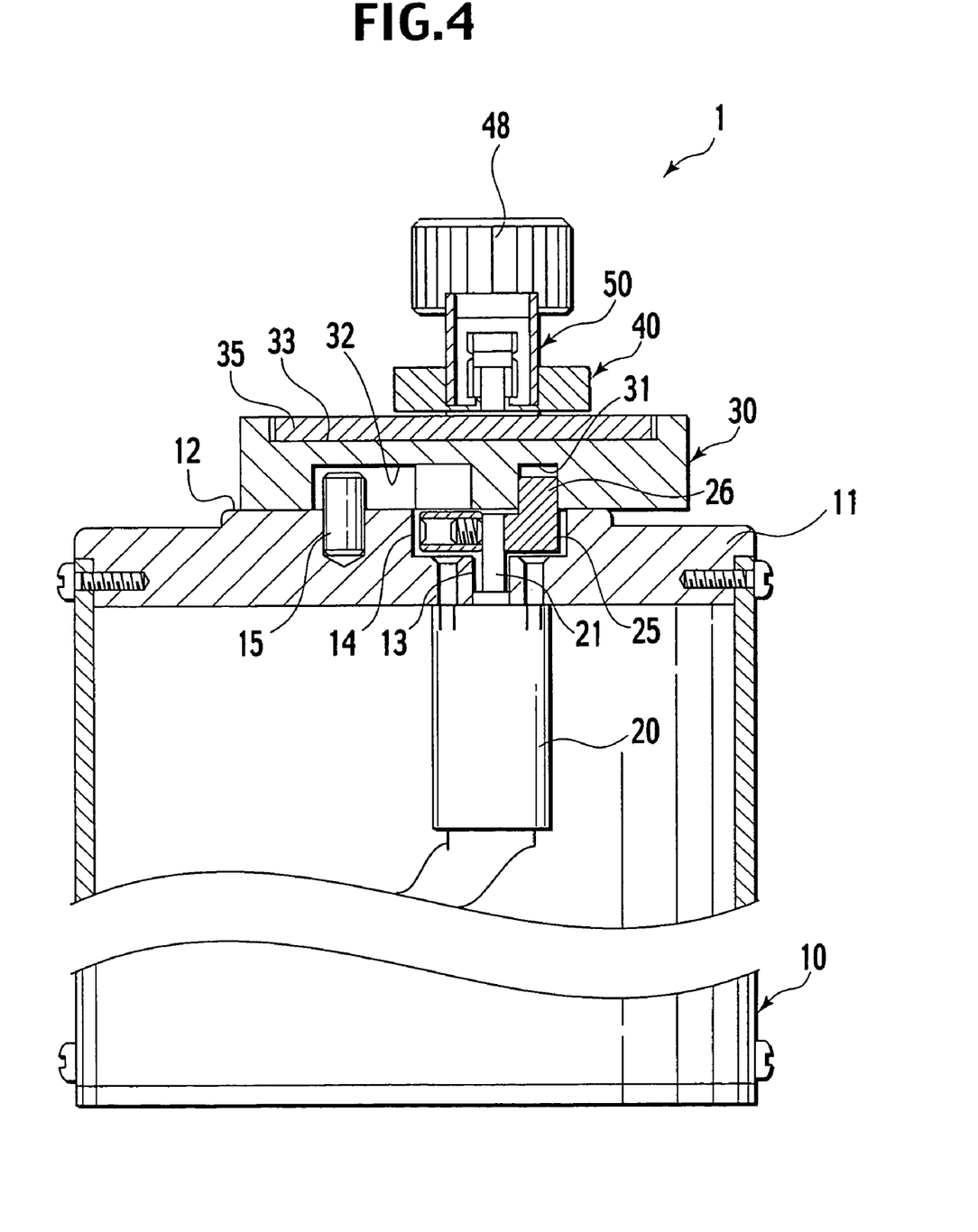
FIG. 4 is a longitudinal sectional view along the line IV—IV of FIG. 3.

FIGS. 1 to 4 show an optical connector end face grinding apparatus 1 according to a first exemplary embodiment of the invention. FIG. 1 is a front view, FIG. 2 is a front view with the optical connector removed, FIG. 3 is a plan view, and FIG. 4 is a longitudinal sectional view of the optical connector end face grinding apparatus 1.

The optical connector end face grinding apparatus 1 attaches to a resinous optical connector with optical fiber having a rectangular shape in cross-section, and is used for re-grinding the end face of the ferrule of the optical connector.

The optical connector end face grinding apparatus 1 comprises a grinding apparatus main body 10, a sliding plate 30 and a grinding holder 40.

The grinding apparatus main body 10 forms a generally cylindrical shape, having a circular base plate 11 secured at the upper part thereof in a substantially horizontal position. A circular sliding surface 12 that is concentric with the base plate 11 is formed protruding up from the upper face of the base plate 11. A motor 20 (FIG. 4) is attached to the lower surface of the base plate 11 in a position slightly off the center of the base plate 11, i.e. eccentric thereto. Shaft 21 of the motor 20 extends vertically upwardly through a through hole 13 formed in the base plate 11 and into a circular depression or cutout 14 in communication with the upper part of the through hole 13.

A generally disc-shaped eccentric member 25 is disposed in the circular depression 14 of the base plate 11 and the shaft 21 of the motor 20 is secured in the center of the eccentric member 25 by a set screw or the like. An upwardly oriented eccentric protrusion 26 is formed on the eccentric member 25 and positioned off center in relation to the center of eccentric member 25, which coincides with the axis of shaft 21. An upwardly projecting guide pin 15 is secured to the base plate 11 through sliding surface 12 and is positioned on the opposite side of the center of the base plate 11 in relation to the axis of shaft 21 of the motor 20.

The sliding plate 30 is formed in a substantially hexahedron (rectangular box-like) shape and slides on the sliding surface 12 of the base plate 11. An insertion hole 31 into which the eccentric protrusion 26 of the eccentric member 25 is inserted, is formed in the lower surface of the sliding plate 30 in a position slightly offset from the center thereof, on a centerline along the lengthwise direction of the lower surface. Further, a slot 32 into which the guide pin 15 is engaged is formed in the lower surface of the sliding plate 30 extending along that centerline and is positioned on the opposite side of the center of sliding plate 30 in relation to the insertion hole 31.

The length of the slot 32 corresponds to the distance of the position when the eccentric protrusion 26 of the eccentric member 25 is furthest removed from the guide pin 15 and the position when the eccentric protrusion 26 is closest to the guide pin 15. Accordingly, as the shaft 21 rotates when driven by the motor 20, the eccentric member 25 secured to the shaft 21 rotates and the eccentric protrusion 26 moves along a circular path or locus and with it the insertion hole 31 of the sliding plate 30 and the slot 32 moves in a reciprocal motion along the guide pin 15.

A shallow rectangular depression 33 is formed on the upper face of the sliding plate 30 and a grinding pad 35 is disposed in the depression 33. A grinding film 36 (grinding film or finishing film) is placed on the grinding pad 35 when grinding operations are performed.

The grinding holder 40 is disposed in contact with the upper face of the sliding plate 30 and is attached to the upper face of the grinding apparatus main body 10 by thumb screws 48. These screws 48 are disposed at both ends of a line segment orthogonal to a straight line connecting the shaft 21 of the motor 20 and the guide pin 15. The center of the line segment is the position of the axis of shaft 21.

A depression 41 (FIG. 2) is formed in the grinding holder 40 to accommodate installation of an adapter 50 capable of attachment to and detachment from an optical connector 60 (a connector with optical fiber attached). A sleeve 42 having a through hole 43 to accommodate insertion of a ferrule 65 of the optical connector 60 mounted in the adapter 50 is formed in the center of the depression 41 corresponding to the position directly above the axis of shaft 21 of the motor 20.

The adapter 50 is formed in a substantially rectangular tube shape to accommodate insertion of the optical connector 60. Key grooves 51 that engage positioning keys 61 disposed on opposite side surfaces of the optical connector 60 is formed in opposing side surfaces in the adapter 50, while grippers 52 that grip and retain an engaging part 62 of the optical connector 60 are disposed on another pair of opposing side surfaces of the adapter 50.

A bottom plate 53 from which the grippers 52 of the adapter 50 extend is disposed in a downwardly depressed condition at a predetermined pressure to the bottom surface of the depression 41 by compression springs 45, the upper ends of which are locked by a washer 44 secured to the grinding holder 40 by screws or the like.

The optical connector 60 is inserted in the adapter 50 so that the positioning keys 61 engage the key grooves 51 and when the grippers 52 of the adapter 50 grip and retain the engaging part 62 of the optical connector 60, the optical connector 60 is held in the grinding position (with the ferrule at the required height). That is to say, the ferrule 65 of the optical connector 60 extends into the through hole 43 of the sleeve 42 and protrudes downwardly at the predetermined distance from the lower surface of the grinding holder 40 in contact with the grinding film 36 on the grinding pad 35.

As described, the bottom plate 53 of the adapter 50 is pressed down at the predetermined pressure to the bottom surface of the depression 41 due to the operation of the compression springs 45. Accordingly, even if there is some discrepancy in the length of the ferrule 65 of the optical connector 60 projected from the grinding holder 40, it is absorbed by the compression springs 45 such that the tip of the ferrule 65 can be held consistently in the appropriate grinding position (at the required height).

The preparatory operations performed for re-grinding a ferrule end face of an optical connector 60 using the optical connector end face grinding apparatus 1 will now be described.

Figure 5:
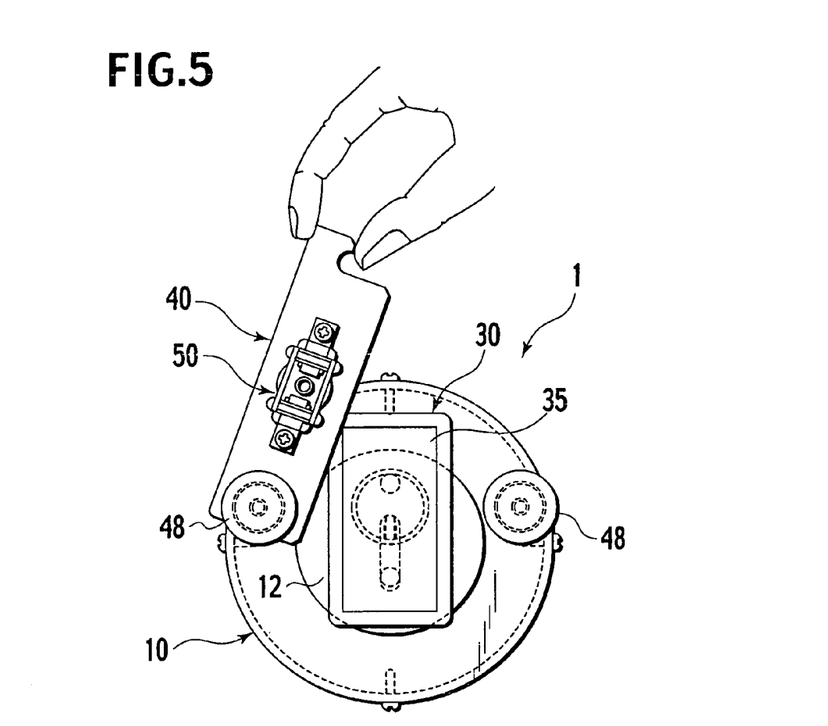
FIGS. 5–10 are explanatory plan view drawings showing the preparatory procedures for using an optical connector end face grinding apparatus according to the invention.

Firstly, as shown in FIG. 5, the left and right thumb screws 48 are loosened and the grinding holder 40 is pivoted outwardly so as to move to the outside of the grinding apparatus main body 10.

Figure 6:
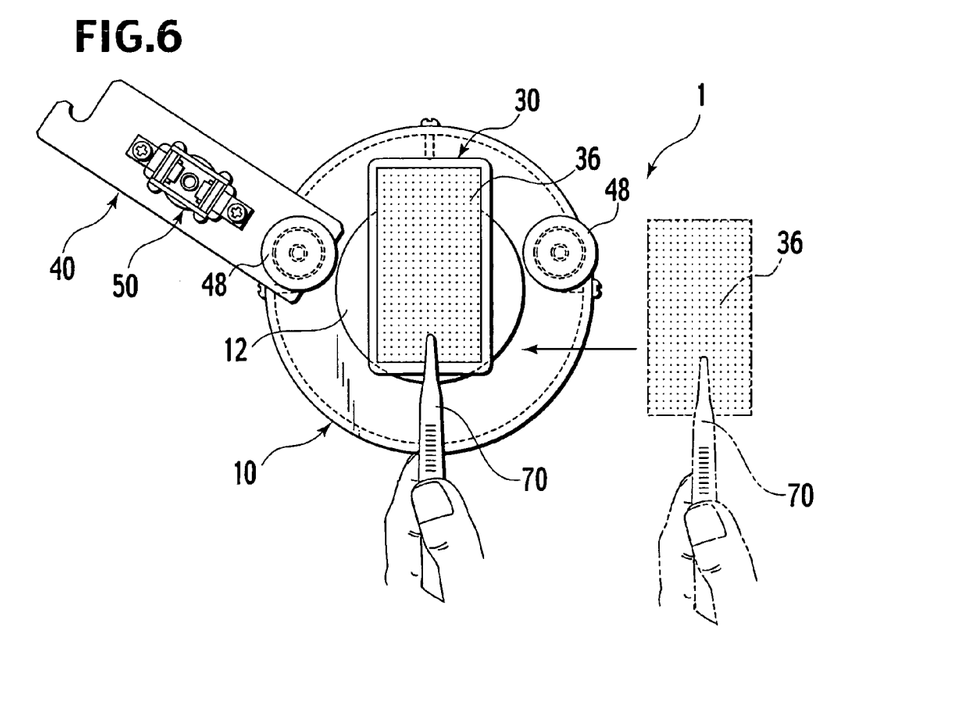

Next, as shown in FIG. 6, grinding film 36 is applied over the grinding pad 35 set on the sliding plate 30. It is preferable for this grinding film 36 to be handled using tweezers 70.

Figure 7:
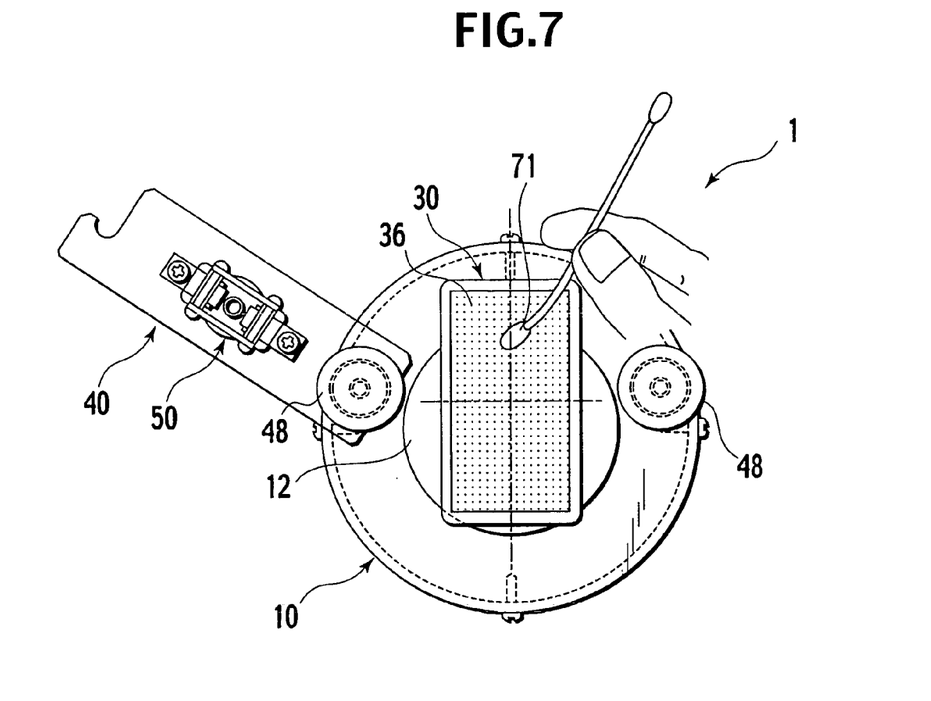

Then, referring to FIG. 7, the entire face of the grinding film 36 is firmly applied over the grinding pad 35. Preferably, a cotton tipped applicator 71 is used to firmly apply the grinding film 36 to the grinding pad 35 such that the entire face of the grinding film 36 is pressed onto the grinding pad 35.

Figure 8:
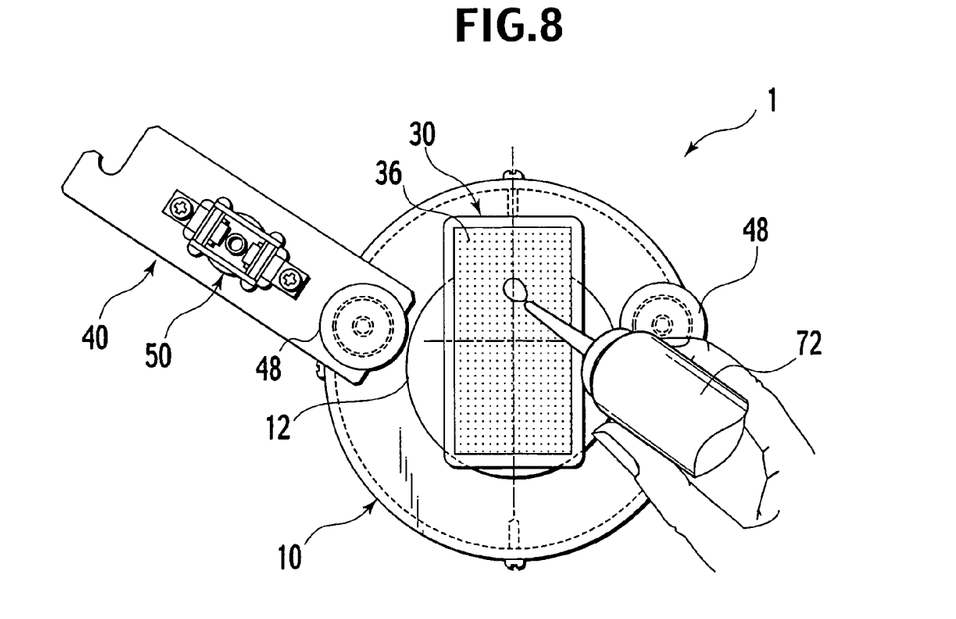

Next, as shown in FIG. 8, using an additional accessory, such as a bottle 72, a minute quantity of distilled water is applied in roughly the central part of half the surface of the grinding film 36 (in FIG. 8, the upper half), and then the distilled water is dispersed over that half of the grinding film 36 using the cotton tipped applicator 71.

Figure 9:
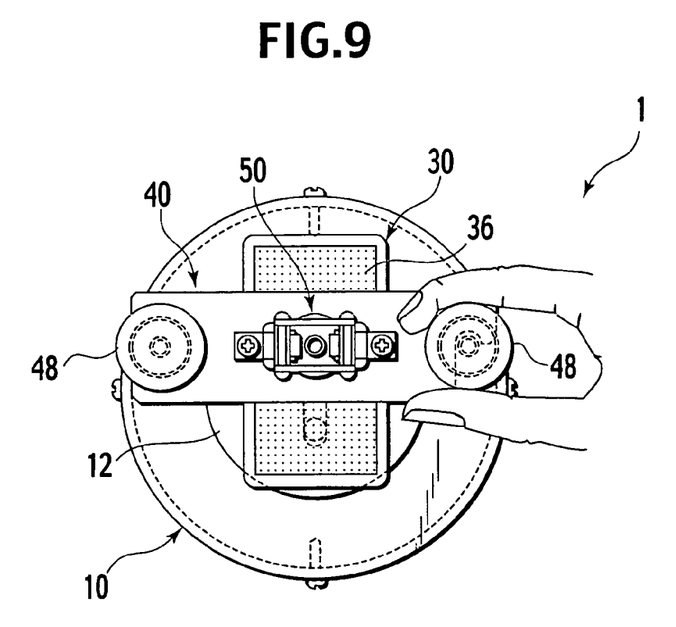

Then, referring to FIG. 9, the grinding holder 40 is pivoted inwardly over the grinding apparatus main body 10 and the both left and right thumb screws 48 are then tightened.

Figure 10:
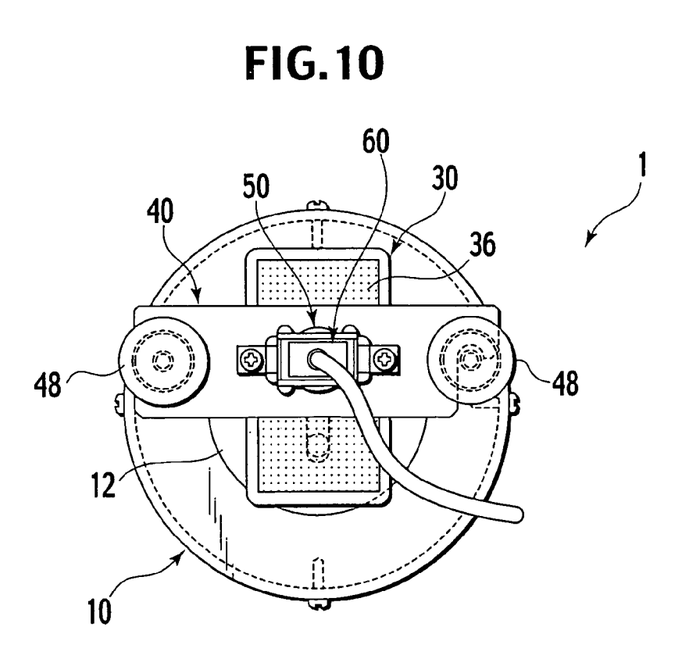

Finally, as shown in FIG. 10, the optical connector 60 to be re-ground is installed in the adapter 50 of the grinding holder 40.

The preparations to perform re-grinding operations are completed in this way and the grinding operation is commenced by energizing the motor 20 with a switch, not shown but disposed in an appropriate location on the grinding apparatus main body 10. Once the switch of the motor 20 is turned on, the motor 20 commences driving and the eccentric member 25 rotates, causing the sliding plate 30 to slide due to the movement of the eccentric protrusion 26 traveling in a circular path.

Figure 11A:
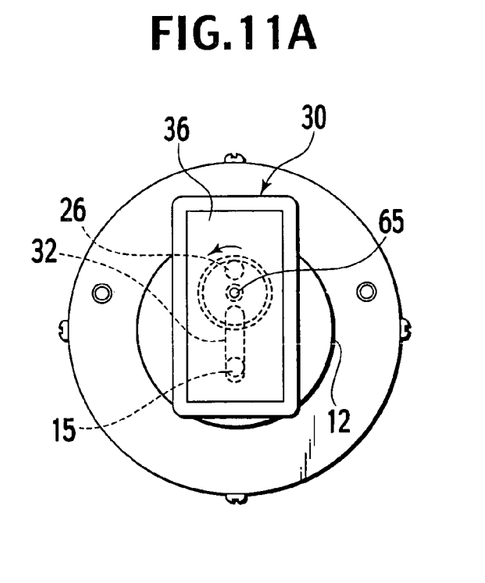
FIGS. 11A–11D are explanatory plan view drawings illustrating the grinding operations of the optical connector end face grinding apparatus of the invention.
Figure 11B:
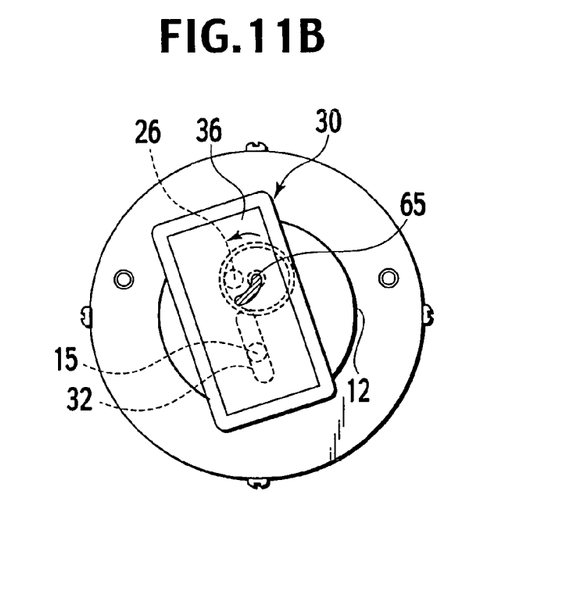

Referring to FIGS. 11A–11D (with the grinding holder 40 removed for clarity), as the eccentric member 25 makes a ¼ rotation such that the eccentric protrusion 26 moves along ¼ of a circular arc (9020 ), the sliding plate 30 slides from the position shown in FIG. 11A to the position shown in FIG. 11B.

During this interval, the ferrule 65 of the optical connector 60 is ground while moving through ¼ of a circular arc (90°) relative to the grinding film 36 on the sliding plate 30 as shown by the shaded area in FIG. 11B.

Figure 11C:
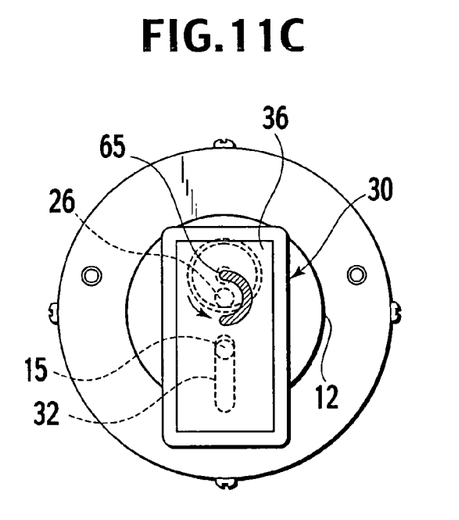

Continuing, the sliding plate 30 moves from the position shown in FIG. 11B to the position shown in FIG. 11C as the eccentric member 25 makes a further 90° rotation and the eccentric protrusion 26 moves through a 90° circular arc.

During this interval, the ferrule 65 of the optical connector 60 is ground while moving through a further 90° circular arc relative to the grinding film 36 on the sliding plate 30 as shown by the shaded area shown in FIG. 11C. Accordingly, the ferrule 65 is ground while moving through a circular arc of 180° during the period of movement from the initial position shown in FIG. 11A to the position shown in FIG. 11C.

Figure 11D:
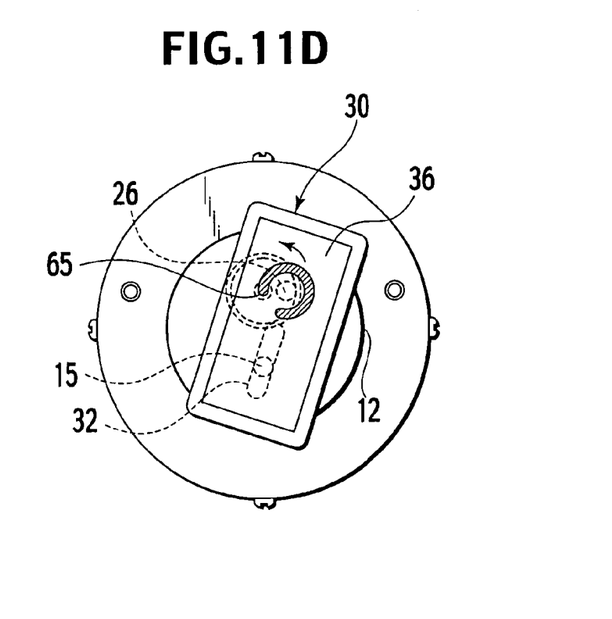

Continuing, the sliding plate 30 moves from the position shown in FIG. 11C to the position shown in FIG. 11D as the eccentric member 25 makes a further 90° circular arc rotation and the eccentric protrusion 26 moves through a 90° circular arc.

During this interval, the ferrule 65 of the optical connector 60 is ground while moving through a further 90° circular arc relative to the grinding film 36 on the sliding plate 30 as shown by the shaded area in FIG. 11D. Accordingly, the ferrule 65 is ground while tracing out 270° of a circular arc during the period of this movement from the initial position shown in FIG. 11A to the position shown in FIG. 11D.

Continuing, the sliding plate 30 moves from the position shown in FIG. 11D back to the position shown in FIG. 11A as the eccentric member 25 makes a further 90° circular arc rotation and the eccentric protrusion 26 moves through a 90° circular arc.

During this interval, the ferrule 65 of the optical connector 60 is ground while moving through a 90° circular arc relative to the grinding film 36 on the sliding plate 30. Accordingly, although not shown in the drawings, the ferrule 65 is ground while rotating in a 360° circular arc from the initial position thereof shown in FIG. 11A.

Thereafter in the same manner, as the eccentric member 25 makes each single rotation of 360°, the ferrule 65 of the optical connector 60 is ground while rotating through a circular arc of 360° relative to the grinding film 36 on the grinding plate 30.

The motor 20 can be set to automatically turn off after driving for 30 seconds, depending on the extent of the damage sustained by the end face. For example, when diamond abrasive paper (to which diamond particles having one micrometer in mean diameter are applied) is used for the grinding film 36, 30 seconds of grinding implemented once should be enough to remove typical damage. Further, 30 seconds of grinding must be implemented two or three times to perform a finishing grind.

Once the re-grinding operation is completed, the optical connector 60 is removed from the adapter 50 of the grinding holder 40.

Because only half the surface of the grinding film 36 is used for grinding in re-grinding operations performed in this way, the remaining unused half can be used by rotating the grinding pad 35 180° and exchanging the unused half for the used half.

When highly durable grinding film such as diamond abrasive paper that does not need to be frequently changed is used for the grinding film 36, it is possible to prepare a plurality of sliding plates 30 so that the grinding film 36 can be changed with each sliding plate 30.

As shown in FIG. 5, where the grinding holder 40 is in the position removed to the outside of the grinding apparatus main body 10, the sliding plate 30 can easily be removed from the grinding apparatus main body 10 by being pulled upwardly. Further, the sliding plate 30 can be attached to the grinding apparatus main body 10 simply by inserting the eccentric protrusion 26 of the eccentric member 25 in the insertion hole 31 and the guide pin 15 in the slot 32.

As described, the optical connector end face grinding apparatus 1 according to the exemplary embodiment of the present invention comprises a grinding apparatus main body including a motor driven eccentric member, a sliding plate that slides in conjunction with the eccentric member and includes a grinding pad on which is disposed a grinding film, and a grinding holder to which an optical connector can be attached and detached that positions the end face of the ferrule of a mounted optical connector in the predetermined position of the grinding film in the rotation axis of the eccentric member.

Thus, the optical connector end face grinding apparatus 1 provides the mechanisms necessary for performance of grinding operations in a simple configuration enabling the apparatus to be produced using parts of polymeric or synthetic resinous material instead of metal parts as are used in conventional technology. Accordingly, the optical connector end face grinding apparatus 1 can be economically produced and can be made as a small, lightweight device. Further, maintenance of such a device can be performed easily and inexpensively by replacing low cost parts as required.

Moreover, because the optical connector end face grinding apparatus 1 uses rectangular-shaped grinding film, grinding film wrapped in a roll can be used by cutting off the required length of film. Thus, in comparison with conventional technology that employs circular-shaped grinding film, cost reductions are achievable on a piece-by-piece basis of grinding film. Again, because a reduction can be achieved in the cost of the grinding film that is a consumable used by the optical connector end face grinding apparatus 1, the operating costs of the apparatus 1 can be substantially reduced.

Although the invention has been described above by reference to a certain exemplary embodiment of the invention, the invention is not limited to the embodiment described above. Modifications and variations of the embodiment described above will occur to those skilled in the art, in light of the above teachings. The scope of the invention is defined with reference to the following claims.

What is claimed is:

1. An optical connector end face grinding apparatus comprising:

a grinding apparatus main body including:

a base plate having a sliding surface;

an eccentric member supported by the base plate so as to be rotatable about a rotation axis perpendicular to the sliding surface of the base plate, said eccentric member having an eccentric protrusion eccentrically positioned in relation to the rotation axis and extending parallel to the rotation axis; and a guide pin fixed to the base plate and extending parallel to the rotation axis, a sliding plate slidably supported by the sliding surface of the base plate, said sliding plate having an insertion hole for receiving said eccentric protrusion and an elongated slot for receiving said guide pin such that said guide pin can slide only in a lengthwise direction of the slot in relation to said sliding plate, said sliding plate further having a grinding pad on which a grinding film is disposed; and a grinding holder for holding an optical connector with a ferrule and for positioning the end face of the ferrule of the optical connector such that the end face is in contact with said grinding film in the rotation axis of said eccentric member.

2. The optical connector end face grinding apparatus according to claim 1, wherein the diameter of the insertion hole is substantially the same as the diameter of the eccentric protrusion and the width of the elongated slot is substantially the same as the diameter of the guide pin, and wherein the insertion hole is located in the sliding plate along the longitudinal axis of the elongated slot.

3. The optical connector end face grinding apparatus according to claim 1, including a motor for rotating the eccentric member, and when the eccentric member is rotated by the motor, a portion of the sliding plate near the insertion hole rotates substantially about the rotation axis of the eccentric member, and a portion of the sliding plate near the elongated slot reciprocates substantially along the longitudinal axis of the elongated slot.

* * * * *